UNITED STATES PATENT OFFICE.

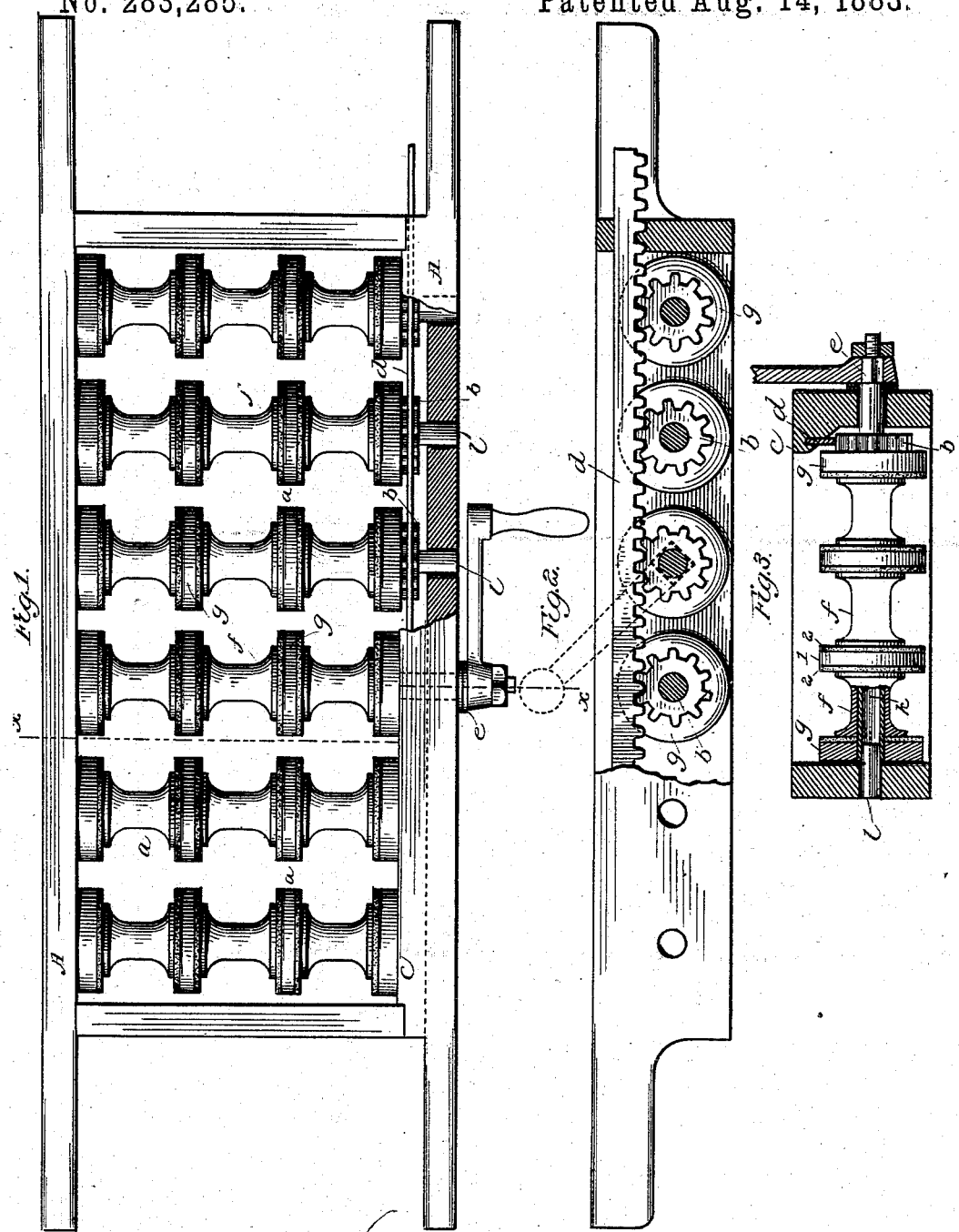

JAMES C. RUNDLETT, OF CAPE ELIZABETH, MAINE.

EGG RACK AND HOLDER.

SPECIFICATION forming part of Letters Patent No. 283,285, dated August 14, 1883.

Application filed February 13, 1883. (No model.)

*To all whom it may concern:*

Be it known that I, JAMES C. RUNDLETT, of Cape Elizabeth, in the county of Cumberland and State of Maine, have invented a new and useful Improvement in an Egg Rack and Holder; and I do hereby declare that the following is a full, clear, and exact description of the same.

My invention relates to an apparatus for turning eggs for the purpose of preventing them from spoiling.

The class of apparatus to which the invention belongs is that in which a series of rollers is used for supporting the eggs, which rollers are all moved simultaneously in the same direction in order to turn the eggs by contact with the surface of the rollers.

My invention consists of an improved device for giving positive movement to all the rollers simultaneously; and, further, it consists of improvements in the rollers themselves, whereby the eggs are supported upon cushions of soft surfaces to prevent breaking, and whereby, also, the construction of the rollers is improved and the cost diminished.

In the drawings, Figure 1 represents a plan view of the apparatus. Fig. 2 is a side elevation of the apparatus, part of the side of the box being broken away to show the mechanism. Fig. 3 is a transverse section on line $x\ x$ of Fig. 1.

In Letters Patent of the United States granted to me on the 15th of August, 1882, No. 262,834, the form of the rollers was substantially the same as in the present improvement, but the rollers were carried in a box or frame and rolled upon a track or lower frame, necessitating the use of two frames. In the present invention the rollers are all mounted in the side strips of that which was the upper frame or box in the patent referred to, and said rollers are turned by positive movement of gearing, thus dispensing with the lower frame entirely and making an exceedingly compact box, which is very desirable under many circumstances.

The rollers are represented in the figures at $a\ a$. They are journaled in the sides of a frame, A, which is preferably open at the top and bottom. Upon the ends of the journals are pinions $b\ b$, fixed preferably upon the axis close to the ends and within the side of the frame. The frame on that side is provided with an overlapping edge, $c$, in which is formed a groove adapted to receive a rack-bar, $d$.
This rack-bar may be made of thin bar-metal, with teeth fitted to the pinions, and as the groove in the overhanging piece is in line with the pinions, the rack-bar, when it is slid into the groove through suitable opening in the ends, is held accurately in connection. Obviously endwise movement of the rack-bar will give positive uniform movement to all the rollers and in the same direction, which movement will cause the eggs to revolve by frictional contact with the rollers. Although I prefer to make use of this overlapping piece, the rack-bar may be run in horizontally or at an angle in grooves in the side pieces of the frame, in which latter case of course the pinions would be beveled to correspond. Any suitable means may be used for giving this endwise movement to the rack-bar. The most convenient is that of a crank applied to the projecting end of one of the axes, as at $e$.
This end of the axis may be square to receive the crank, and preferably I make the crank removable, so that one crank may serve for a number of boxes. The crank being upon one side, the boxes may be piled one upon another, and the crank may be used to turn one after another without removing them from the pile. Instead of the crank, obviously any suitable knob or handle may be used to give endwise movement to the rack-bar. I have shown only one rack-bar; but, if desired, two may be used on each side, in which case no axis will be needed for the rollers. In this case it will be only necessary to duplicate the pinions and put two rack-bars on each side, one above and the other below. For convenience in handling the boxes I provide handles upon each end of the box by extending the side pieces on each side and cutting them out on the bottom, as shown. These handles also protect the rack-bar in its endwise movement, as they project beyond the end of the frame.

The improved construction of the rollers is shown more clearly in section. In forming these rollers for use in boxes of suitable width I have found in practice that where the rollers are turned out from a single rod of wood they are apt to warp or crook, and as it has been found preferable to groove the rollers in order to receive the eggs and hold them up on end and separated from each other, which is the better position for preservation, this difficulty has been a serious one; and, further, the construction required of the turning down of wood to considerable depth to form grooves have caused great amount of work and expense. In my improved construction I turn the rollers out in sections, forming them of spools $f$ and plain disks $g$. These are turned out in the shape shown, or substantially in this shape, and bored axially, and they are then placed upon a metallic axis, $k$. These axes I prefer to make in tubular form of sheet metal, either tin or iron, as may be preferred. The spools and disks are made to fit snugly, and are driven or pressed on into place, in which they are held firmly by driving and snugly-fitting wooden plugs $l$ into each end of the tubes, said plugs or pins being allowed to project out sufficiently to form the journals to the rolls. Instead of tubes, wooden dowel-rods or pins may be used as the axes, the ends of such rods forming the journals for the rolls; but such a roll is not as strong nor as desirable as the one first described.

In order to form a comparatively soft cushion for the eggs and prevent them from breaking when carelessly or quickly handled, I provide a special construction of the disks. The center of the disk $g$ is formed of a plain disk or wheel of wood, and upon each side of it, except for the end disks, I place disks of pasteboard, preferably of wood-pulp board, which is sufficiently soft to form a cushion for the eggs to rest upon. The central wooden disk is indicated at 1, and the pasteboard or pulp disks at 2 2. Of course they are clamped firmly between the spools, which hold them securely in place. The disks at the end need to be provided, manifestly, with only one of the pasteboard disks. This construction prevents all warping or crooking, and is, as I have found, a cheaper construction than to turn the whole roller down out of a solid piece. Of course the soft disks 2 2 may be made of any suitable material, such as felt; and I do not limit myself to the special material shown nor to the form of roll, as grooved or plain rolls may be used, if desired.

I may use stops at the end of the frame to limit the endwise movement of the rack-bar, so that the rollers may receive only so much movement as will be sufficient to invert the eggs.

The rack or frame may be made of any suitable size, but in depth should be at least two and one-half inches. This depth will admit of their being piled one upon the other without the rolls of the upper interfering with the eggs of the one below. When so piled, all light is excluded from the eggs, as well as insects, &c., ample ventilation, however, being secured through the openings at the top and bottom of the pile and between the eggs.

A rack constructed substantially as above set forth is very convenient for "lighting" or "candling" eggs. The crank being near the center, by passing a light under the rack in a darkened room all of the eggs in the rack may be closely and quickly examined, the rotation of the eggs aiding the operation.

What I claim as my invention is—

1. The described apparatus consisting of a frame, a series of rollers adapted to support the eggs, having pinions upon their ends, combined with a rack-bar and means for giving endwise movement to the rack-bar, substantially as described.

2. The combination of the frame, the series of rollers adapted to support the eggs, the rack-bar and pinions, and the crank fitted to the projecting end of one of the axes of the rollers, substantially as described.

3. The combination of the frame provided with an overhanging piece, $c$, grooved to receive the rack-bar, the rack-bar and pinions, and the rollers.

4. In an egg-turning apparatus consisting of a frame and devices for turning the rollers, the improved rollers, composed of an axle or shaft, spools conforming to the shape of the egg and adapted to support the same, and disks, said spools and disks being arranged on the axle, all as set forth.

5. In an egg-turning apparatus having grooved rollers supporting the eggs, the combination of the axis, the spools, the central disks, 1, and the soft disks 2 2, substantially as described.

In testimony whereof I have signed my name to this specification in the presence of witnesses.

JAMES C. RUNDLETT.

Witnesses:
 JOHN C. COBB,
 ALBERT C. COBB,
 DAVID H. MEAD.